(12) United States Patent
Brebner

(10) Patent No.: US 11,449,314 B2
(45) Date of Patent: Sep. 20, 2022

(54) RAPID APPLICATION DEVELOPMENT METHOD

(71) Applicant: UMAJIN LIMITED, Palmerston North (NZ)

(72) Inventor: David Brebner, Palmerston North (NZ)

(73) Assignee: UMAJIN LIMITED, Palmerston North (NZ)

( * ) Notice: Subject to any disclaimer, the term of this patent is extended or adjusted under 35 U.S.C. 154(b) by 0 days.

(21) Appl. No.: 15/520,099

(22) PCT Filed: Oct. 20, 2015

(86) PCT No.: PCT/GB2015/053106
§ 371 (c)(1),
(2) Date: Apr. 19, 2017

(87) PCT Pub. No.: WO2016/063022
PCT Pub. Date: Apr. 28, 2016

(65) Prior Publication Data
US 2018/0018148 A1  Jan. 18, 2018

(30) Foreign Application Priority Data
Oct. 20, 2014  (GB) ..................... 1418612

(51) Int. Cl.
*G06F 8/34*    (2018.01)
*G06F 9/455*   (2018.01)
(Continued)

(52) U.S. Cl.
CPC .................. *G06F 8/34* (2013.01); *G06F 8/38* (2013.01); *G06F 9/455* (2013.01); *G06F 3/0482* (2013.01)

(58) Field of Classification Search
CPC ..... G06F 8/30–78; G06F 3/048–04897; G06F 8/34; G06F 8/38; G06F 8/76; G06F 3/0482; G06F 3/04847; G06F 9/455
(Continued)

(56) References Cited

U.S. PATENT DOCUMENTS 6,615,278 B1 *  9/2003  Curtis ................. G06F 9/44505
                                                        719/310
6,957,439 B1 * 10/2005  Lewallen ................ G06F 8/51
                                                        717/106
(Continued)

OTHER PUBLICATIONS

Golemanova, Emilia, et al., Declarative and Imperative Approaches for Proving Turing Completeness of SPIDER, CompSysTech '20: Proceedings of the 21st International Conference on Computer Systems and Technologies '20, Jun. 2020, pp. 94-100, [retrieved on May 7, 2022], Retrieved from the Internet: <URL:http://dl.acm.org/>.*

(Continued)

*Primary Examiner* — Geoffrey R St Leger
(74) *Attorney, Agent, or Firm* — Saul Ewing Arnstein & Lehr LLP

(57) ABSTRACT

An application development editor displays in a graphical user interface a list or other arrangement of variations based on or applying to conditions in the application, each variation being associated with one or more changes in properties or events in the application. The editor enables a user to select a specific variation and then displays the user interface implications or consequences of that selection. Selecting a specific variation is programmatically equivalent to a specific conditional logic branch or 'if . . . then' code sequence. The invention enable someone with no, or very limited, code writing skills, such as a designer, to be able to produce an application with fully functioning, correct and potentially complex conditional logic.

28 Claims, 12 Drawing Sheets

(51) Int. Cl.
*G06F 8/38* (2018.01)
*G06F 3/0482* (2013.01)

(58) Field of Classification Search
USPC ....... 717/105, 109, 113, 117, 125, 134, 135, 717/138, 139
See application file for complete search history.

(56) References Cited

U.S. PATENT DOCUMENTS

| | | | | |
|---|---|---|---|---|
| 7,318,066 | B2 * | 1/2008 | Kaufman | G06F 16/252 |
| 7,624,372 | B1 * | 11/2009 | Stewart | G06F 8/34 |
| | | | | 717/113 |
| 7,631,006 | B2 * | 12/2009 | Hagstrom | G06F 8/20 |
| 7,861,177 | B2 * | 12/2010 | Wu | G06F 9/44505 |
| | | | | 715/762 |
| 8,219,228 | B2 * | 7/2012 | Yucel | G06F 30/15 |
| | | | | 700/97 |
| 8,533,667 | B2 * | 9/2013 | Alexander | G06F 8/315 |
| | | | | 717/109 |
| 8,683,359 | B2 * | 3/2014 | Jugel | G06F 8/34 |
| | | | | 715/762 |
| 8,813,028 | B2 * | 8/2014 | Farooqi | G06F 8/34 |
| | | | | 717/107 |
| 9,110,673 | B2 * | 8/2015 | Ostroff | G06F 8/34 |
| 9,336,023 | B2 * | 5/2016 | Mukkamala | G06F 8/20 |
| 9,880,712 | B2 * | 1/2018 | Slawson | G06F 3/0484 |
| 2004/0073565 | A1 * | 4/2004 | Kaufman | G06F 16/252 |
| 2005/0240917 | A1 * | 10/2005 | Wu | G06F 8/71 |
| | | | | 717/162 |
| 2006/0218521 | A1 * | 9/2006 | Hagstrom | G06F 8/20 |
| | | | | 717/101 |
| 2011/0098835 | A1 * | 4/2011 | Yucel | G06F 30/15 |
| | | | | 700/103 |
| 2011/0154287 | A1 * | 6/2011 | Mukkamala | G06F 8/20 |
| | | | | 717/105 |
| 2011/0161924 | A1 * | 6/2011 | Alexander | G06F 8/315 |
| | | | | 717/109 |
| 2011/0289439 | A1 * | 11/2011 | Jugel | G06F 8/34 |
| | | | | 715/771 |
| 2012/0290429 | A1 * | 11/2012 | Ostroff | G06F 8/34 |
| | | | | 705/26.5 |
| 2014/0019891 | A1 * | 1/2014 | Borah | G06F 8/30 |
| | | | | 715/762 |
| 2014/0026113 | A1 * | 1/2014 | Farooqi | G06F 8/36 |
| | | | | 717/107 |
| 2014/0201724 | A1 | 7/2014 | Nelson | |
| 2014/0223413 | A1 | 8/2014 | Ge | |
| 2015/0074546 | A1 * | 3/2015 | Slawson | G06F 3/0484 |
| | | | | 715/747 |

OTHER PUBLICATIONS

MacNeil, Ron, TYRO: A Constraint Based Graphic Designer's Apprentice, 1989 IEEE Workshop on Visual Languages, Oct. 1989, 6 pages, [retrieved on May 7, 2022], Retrieved from the Internet: <URL:http://ieeexplore.ieee.org/>.*
International Search Report, dated Jan. 22, 2016, issued in International Application No. PCT/GB2015/053106.
"Turing completeness"—Wikipedia page dated Oct. 3, 2013.

* cited by examiner

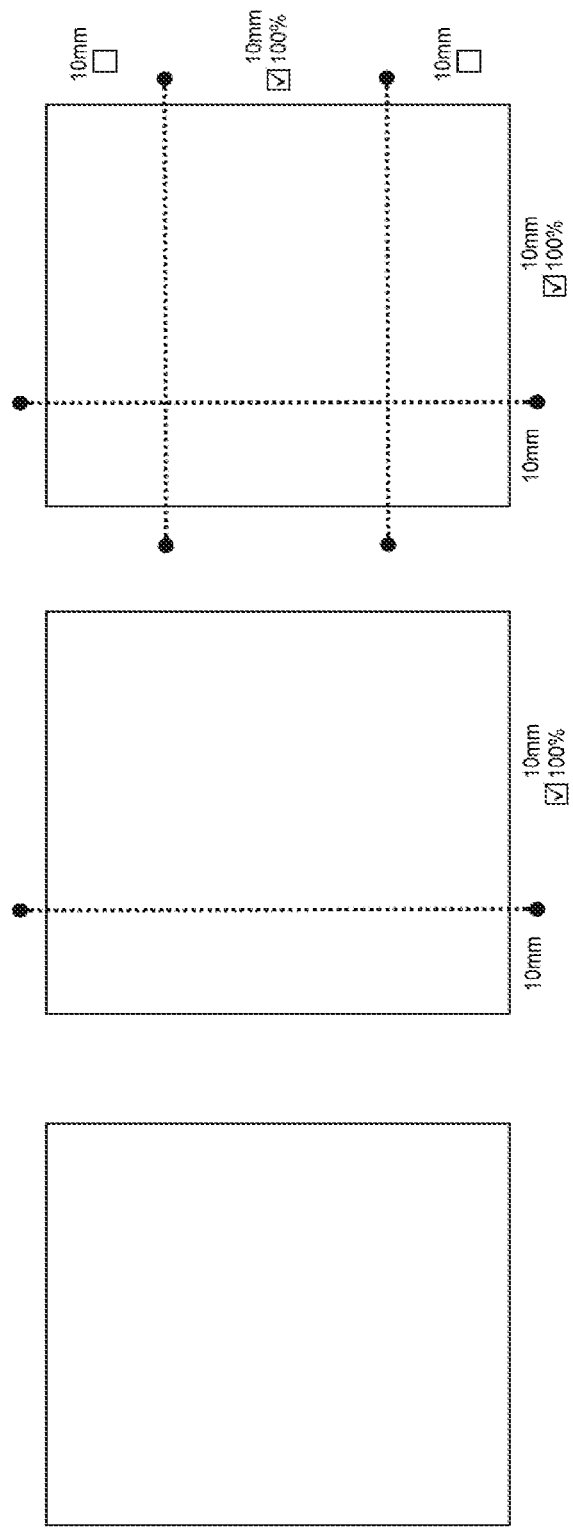

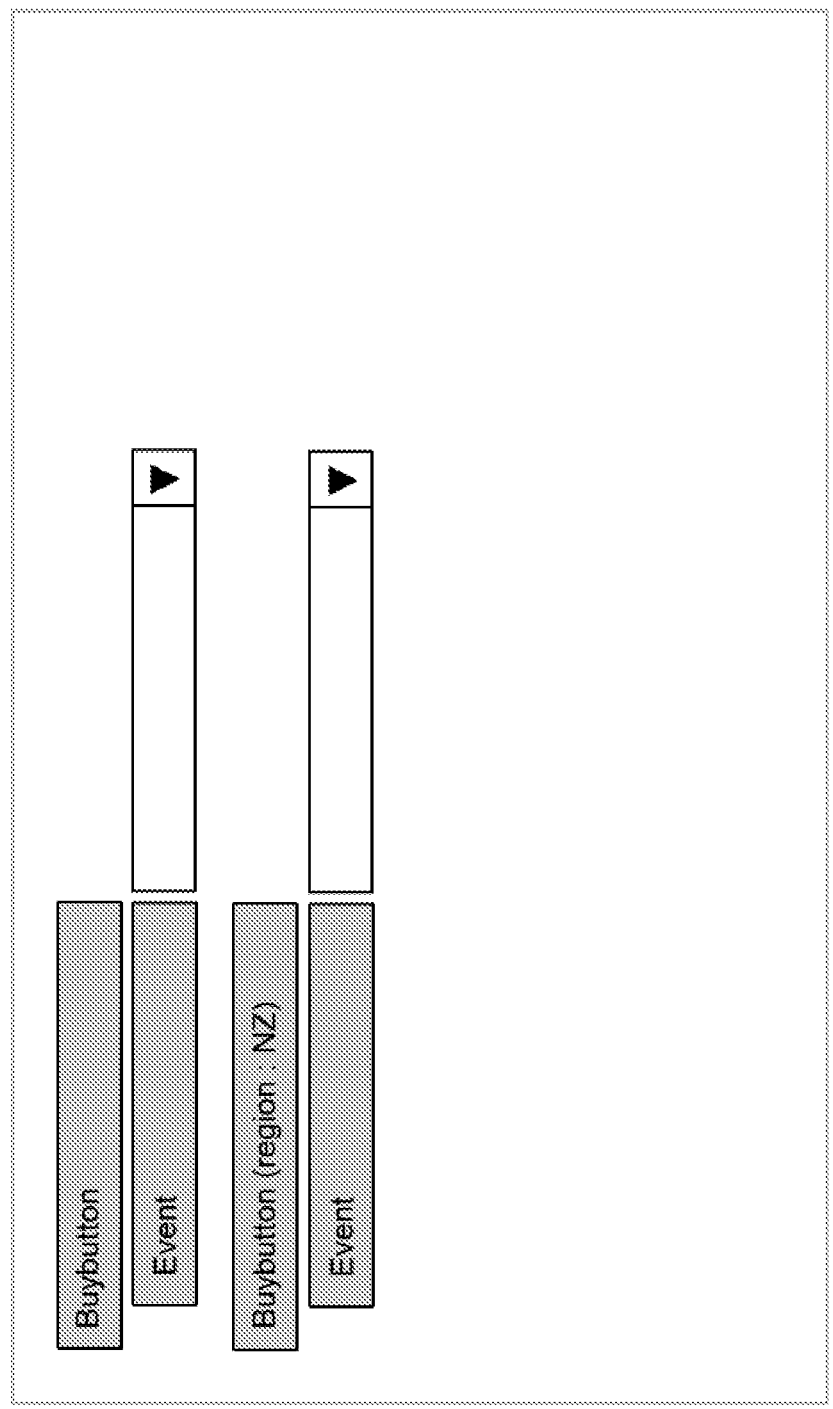

RAPID APPLICATION DEVELOPMENT METHOD

CROSS REFERENCE TO RELATED APPLICATIONS

This application claims the priority of PCT/GB2015/053106, filed on Oct. 20, 2015, which claims the benefit of priority to Great Britain Application No, 1418612.6, filed on Oct. 20, 2014, the entire contents of each of which are fully incorporated herein by reference.

BACKGROUND OF THE INVENTION

1. Field of the Invention

This invention relates to a processor implemented method for rapid application development. It enables designers and others who are not expert at programming conditional logic to rapidly develop applications which nevertheless exhibit complex conditional logic behaviours.

2. Description of the Prior Art

Conditional logic is normally programmed by a programmer using 'if . . . then' statements. Whilst programmers are naturally fluent in conceptualising a program and the user interaction options and branches and capturing those in 'if . . . then' statements, designers are not. However, designers are good at designing an effective user interface and appropriate user interaction sequences, whereas programmers are typically poor at this. As a consequence, application development is typically done by programmers who code and designers who add the user interface and user interaction sequences. This is a slow process because of the need to co-ordinate what in practice can be different teams, with different disciplines and styles of working. The key technical problem this invention addresses is to enable someone with no, or very limited, code writing skills, such as a designer, to be able to produce an application with fully functioning, correct and potentially complex conditional logic.

SUMMARY OF THE INVENTION

The invention is a processor implemented method for rapid application development comprising the steps of:

(a) displaying in a graphical user interface of an application development editor a list or other arrangement of variations based on or applying to conditions in the application, each variation being associated with one or more changes in properties or events in the application;

(b) enabling a user to select a specific variation;

(c) displaying, in the graphical user interface, the user interface implications or consequences of that selection;

and in which the operations of the method are executed by a processor.

BRIEF DESCRIPTION OF THE FIGURES

FIG. 1 shows a page as displayed in a rapid application development editor GUI that implements the invention, with wires added defining regions between them.

FIG. 7 shows how multiple copies of an object can be created by a variation.

DETAILED DESCRIPTION

Figures 2A, 2B, 2C:
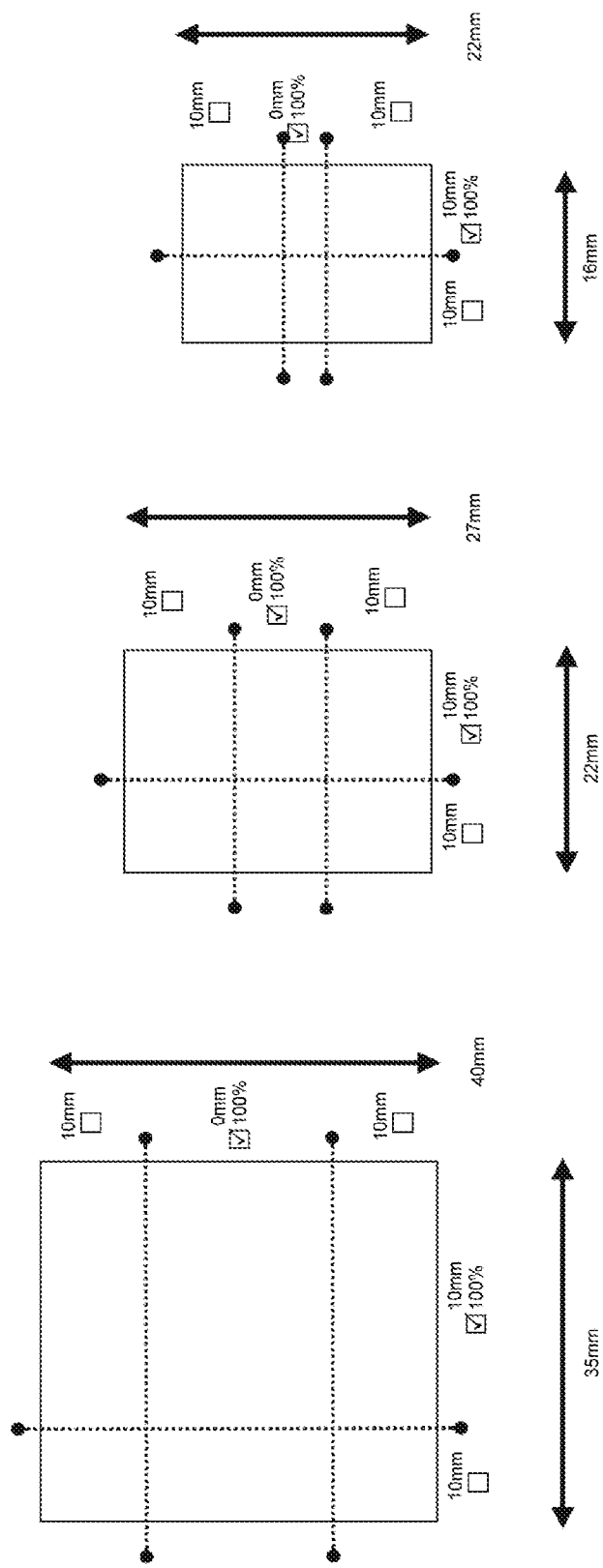
FIG. 2 shows how resizing the page effects the wires and the regions between them.

Overview of the Variations System Implementation of the Invention

The 'Variations System' is a new approach to specifying conditional logic; it is used in a method and system for rapid application development that implements this invention.

The Variations System uses a simple checklist metaphor which allows a non-programmer to easily manage any modifications they want to make to their application based on changing conditions. For example the non-programmer (typically a designer) may be creating an app that has to work with both English language and German language text. He may then want an 'OK' or 'I accept' button to appear wider when the language is set to German to accommodate longer text, since the German version of 'OK' can be many letters long. The Variations System could list in a checklist say ten different languages the program will have to work successfully in; one of these is German. If the designer selects the German language option, then this automatically leads to the 'OK' button being made wider throughout the program (and any other user interface specifics that are relevant to a German language version of the program).

All of this conditional logic would normally be programmed by a programmer using 'if . . . then' statements. Whilst programmers are naturally fluent in conceptualising a program and the user interaction options and branches and capturing those in 'if . . . then' statements, designers are not. By replacing the need for conditional logic to be custom coded by a programmer, and instead graphically capturing the multiple possible conditions (or variations or branches) in a graphical user interface such as a checklist, it becomes possible for non-programmers to rapidly develop robust applications.

In more conventional 'If . . . then . . . ' programming terms, the different conditions may apply to different possibilities for the 'If' part of the statement; the different actions may then apply to different possibilities for the 'then' part of the statement. In the Variations System, different conditions and actions are presented to the designer in a simple GUI such as a menu or checklist.

The key features to the Variations System are:
a) This is not textual procedural code or visual procedural code—it is just a list of conditions and/or actions (no loops, pre conditions or post conditions) that are either selected or not selected from a simple GUI. We call this list of conditions and/or actions the possible 'variations' because they are variations to possible conditions or states.
b) The list of conditions and/or actions is captured as a visual checklist that brings all of the possible variable states of the program into one easy to review place (on a page by page basis—ie for each screen of the application). The app designer has only to select the desired state associated with each condition and/or action by either selecting or not selecting that condition and/or action in the GUI; the designer can therefore focus on design and has no need to understand how to code.
c) The order of the checklist is simply executed top to bottom so there is no ambiguity.
d) Visual flags make it easy for a user to visually see if a variation has been applied in the editor and if the user has tested their application for all possible variations.

When handling events the editor used by the designer for rapid application development provides a linear list of actions without loops or explicit 'if x then do y' conditions; each variation to a condition or an action is either selected or not (e.g. by ticking a check box or some other equally simple interaction). This makes it extremely easy for anyone to use without needing to understand the logic and flow of programming languages.

The possible different actions and conditions are captured in a static form such as a check list; it becomes very fast to see what conditions and/or actions have been selected by simply reviewing the check lists to see what has been selected and what has not.

For example, the designer might be faced with deciding whether or not to include a 'back' soft button in each screen or not; Android apps tend not to use a separate soft 'back' buttons since there is a 'back' button as part of the Android hardware interface, but Apple iOS apps do tend to need a back button. One solution is to custom code one version of the app for Android and a different version for Apple iOS; but with the Variations System, there need be just one app developed with the designer simply selecting either an Android check box or an iOS check box or associated menu items—all UI changes, including hierarchical or consequential changes on that choice are then automatically implemented.

Another example is making an app look good in both portrait and landscape modes. With this editor, then all differences between portrait and landscape mode are surfaced or listed in the variations checklist, so the designer can readily and easily select the appropriate options. In the editor GUI, a small icon, such as a small 'v' icon, appears next to each condition or action to which a variation has been or could be applied; the editor also shows the related properties associated with that variation in a window or pane.

The Variations System is not a Turing complete system. However, because variations can override not just properties—but override events—it is possible to specify different actions for different variations. If we take the example where Android is one variation and Apple iOS is a another variation, then the action or event would be calling up a map when needed within an application. So for Android, pressing a map button causes the action of linking to the Google maps application. Then, in an iOS variation, the action associated with pressing the button is overridden to instead use the Apple maps application. All the designer has to do is select either Android or Apple iOS from a list of possible operating systems; the editor then automatically takes the selected condition (ie Android or Apple iOS) and uses the events or actions associated with the selected condition.

Generalising, the designer can readily see exactly what variations apply to Android and what apply to Apple iOS—these are laid out in a simple to review GUI checklist or other format, as opposed to being buried in perhaps hundreds of pages of code. Note that there is a shared underlying project to both the Android and Apple iOS versions, with all bindings, data objects etc being shared.

Note also that all actions or commands can in effect be wrapped by a variation which is selectable from a simple GUI like a checklist. The key and important result is that in both the case of the actions (functions) and the variations (conditional overrides) the user is only managing independent lists of items. This massively simplifies the complexity while still providing very powerful and flexible behaviours.

List of Examples of Types of Variations (or, Equivalently, Conditions that can be Subject to Different Variations)

Region (country)
Language
OS (operating system)
Orientation (landscape/portrait)
Device type (watch, phone, tablet, computer, TV)
PPI (pixel density)
Model (Manufacturer & device model)
Custom (user defined flags)

For example if the language is German then the related action is to design the buttons wider to allow for longer words. If the region is USA, then the related action is to show a special offer for delivery.

In the following, we describe features of the Umajin rapid application development editor, from Umajin Limited. Sections 1-4 describe the some layout tools in the Umajon editor; Sections 5-8 describe the Variations System in more detail.

Introduction to the Umajin Resizing System

The Umajin resizing system allows users to design layouts and the reflowing of the content through those layouts. This will be explained in the context of how the Variations System can be used to modify these layouts in very flexible ways which would normally require programming and complex logic.

1) Flow Panels

Flow panels are a rectangular container which can hold other content and can be orientated vertically or horizontally. Flow panels can be connected to each other in a non-circular sequence.

Items which are added to the first flow panel will be added in the direction of the dominant axis. When there is no more space for an item it will be added to the next flow panel in the sequence until all space is occupied or items expended.

Any change to the layout which resizes the flow panels will cause this reflow to be reapplied.

Flow panels can also manage sizing items added in the non-dominant axis. For example an image added to a vertical flow panel would be added beneath the last piece of content, and resized to fill the width of the flow panel.

Flow panels can also manage content padding between items. This determines the space between each item added in the dominant axis.

2) Layout Resizing Using Control Wires

A designer can take a blank page layout and add n number of vertical or horizontal control wires. Each control wire divides the abstract page layout into a series of vertical or horizontal regions.

Each region can have a dimension entered by the designer as a distance in millimetres and an optional percentage.

All percentages will be normalised and are applied until the minimum distance in millimetres is reached. When the minimum distance in millimetres is reached for all regions then all regions will be scaled proportionally. If no percentages are specified then the region sizes in millimetres will be scaled proportionally. The effect is that the designer can quickly define the correct layout for different screen sizes and proportions.

FIG. 1 shows a page with wires added defining regions between them.

FIG. 1A shows the original blank page for the app. In FIG. 1B, a vertical wire is added by the designer; the designer positions the wire so that the left side has a minimum 10 mm width. There is a check box on the right side—if this is selected, then a rule engine first allocates content to flow in the left side, with a fixed minimum width of 10 mm, and then flows content into the right side, with a width that occupies 100% of whatever is left, after 10 mm has been allocated to the left side column. If the box is not checked, then the rule engine allocates equal width to the left side and right side columns. Hence, if the total width is 30 mm, then each column is 15 mm in width. FIG. 1C shows two horizontal control wires added to the FIG. 1B layout, dividing the page into three rows of minimum 10 mm each; the middle check box is ticked, meaning that the top and bottom row will have 10 mm height and the middle row a minimum 10 mm height, but varying as needed to fill the available space. So if the page is 30 mm in height, all three rows are 10 mm. If the page height is 50 mm, then the top and bottom rows are 10 mm, and the middle row is 30 mm in height. If none of the check boxes for the horizontal control wires are selected, then the rows all scale in height equally. Only one check box for the horizontal control wires can be selected at a time.

FIG. 2A-2C show how resizing the page effects the wires and the regions between them)

In FIGS. 2A and 2B, you can see how the initial page dimensions can be reduced to the middle view with the regions measured in percentages reducing and the regions measured in mm holding constant. So, in FIG. 2A, the left colum has a fixed width of 10 mm, and the right column expands to occupy the remaining width, i.e. 25 mm, since the associated check box is selected and the total width is 35 mm. The top and bottom rows have a fixed height of 10 mm, and the middle row, since its check box is selected, expands to fill the remaining 20 mm, since the total height is 40 mm. In FIG. 2B, we see the effect of these same control wires on a much smaller screen size. The left side column remains at 10 mm width, but the right colum now occupies the remaining space, namely 12 mm. The top and bottom rows remain at 10 mm height, but the middle row is shrunk to just 7 mm in height. However in the third view, FIG. 2C you can see that the horizontal reduction has exceeded the combined width in mm so the regions are scaled proportionally—i.e. the left and right sides have a minimum width of 10 mm, but since the total available width is 16 mm, both columns are scaled down to 8 mm. Vertically there is no minimum height in mm for the middle region so it reduces to just 2 mm in height. If the screen size were to reduce further, then the middle just continues to collapse until it will reach zero and then the other two regions will reduce proportionally (so if the total height is 16 mm, then each top and bottom row has a height of 8 mm each).

3) Snapping/Anchoring Content to Control Wires

Figure 3B:
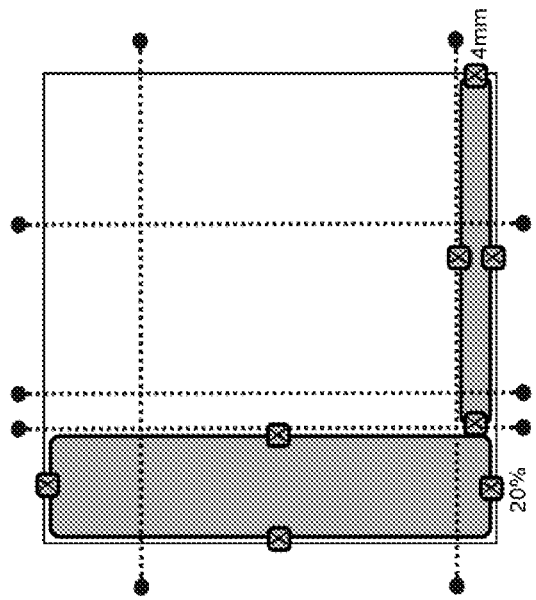
FIGS. 3A and B show how a designer can snap the edges of content containers to control wires.
Figure 3A:
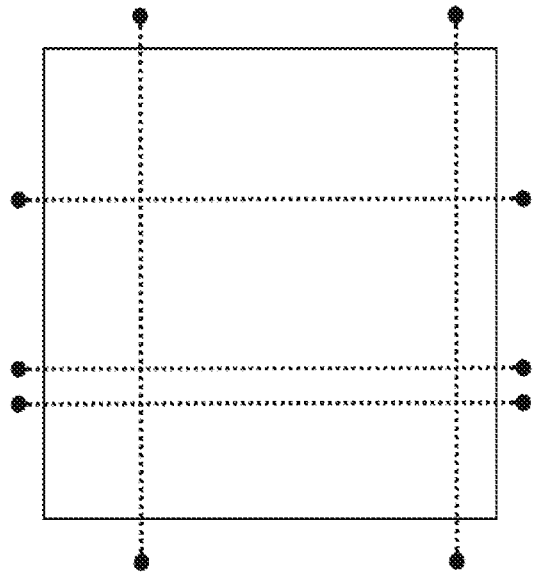

FIGS. 3A and B show how a designer can snap the edges of content containers to control wires.

Assigning a content containers edge to snap to a control wire is at the heart of the flexible layout system. FIG. 3A shows a typical page layout with various control wires. FIG. 3B shows a content container in the first column, spanning all three rows: this could be a sidebar with an index. FIG. 3B also shows a content container in the lowest row, spanning the second, third and fourth columns; this could be a tool bar. This means that as the page undergoes dynamic changes in its width and height, that the control wires are adjusted based on the rules specified when they were configured, and the snapped content containers move along with them.

The ability to set control wire regions in millimetres and in percentages is important as in FIG. 3 a sidebar for content can be configured which scales with the layout—while a toolbar at the bottom can be allocated which has a fixed height suitable for holding finger sized buttons. It's especially useful to be confident that the index section and the toolbars section behave in an easily understood manner as the page is displayed on different screen siezes and shapes.

4) Floating Content with Private Control Wires

Figure 4B:
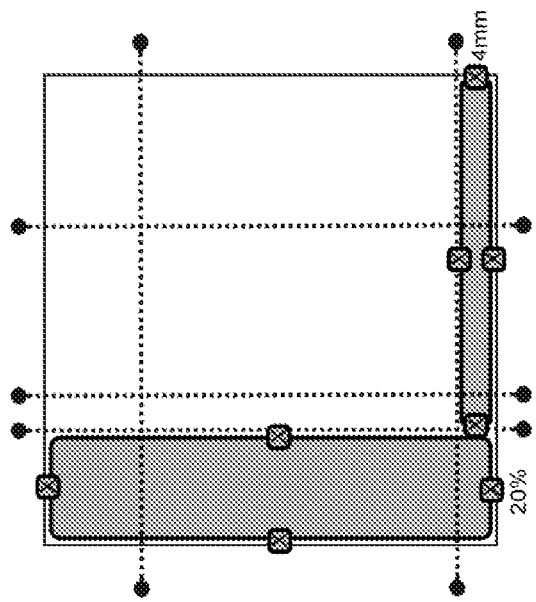
FIG. 4 shows a 'Float mode' where a container is controlled by private guide wires.
Figure 4A:
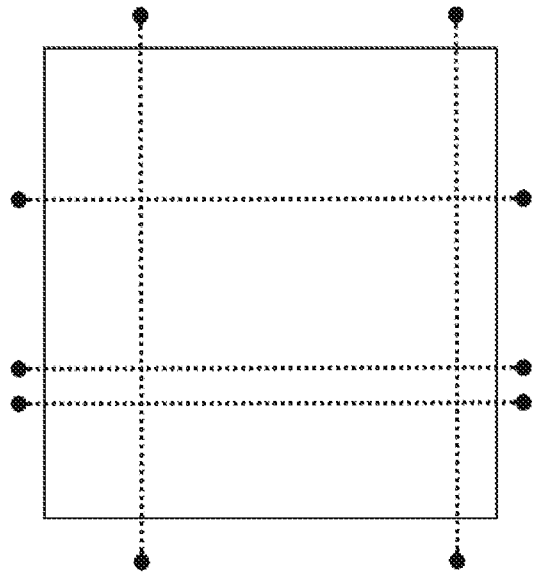

FIG. 4 shows a 'Float mode', where a container is controlled by private guide wires.

Content containers on the page, or inside another content container can use 'Float mode'. This is where the container is allocated its own private pair of vertical and horizontal guide wires which can be used to control the position and size of the container.

This is useful when a designer needs to position a container inside another container without needing to split the core guidewire layout in complex ways.

5) Variations and Reflow with Control Wires

Figure 5C:
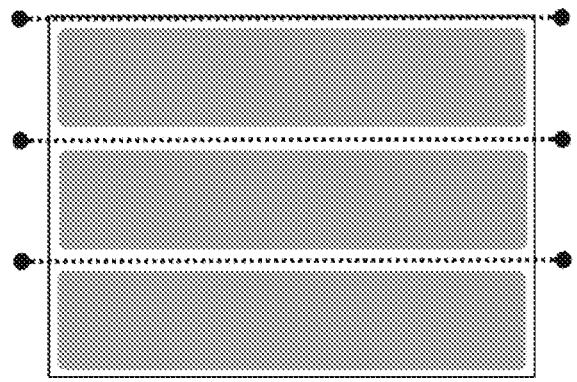
FIGS. 5A, B and C shows moving from a four column landscape layout to a three column portrait layout.
Figure 5B:
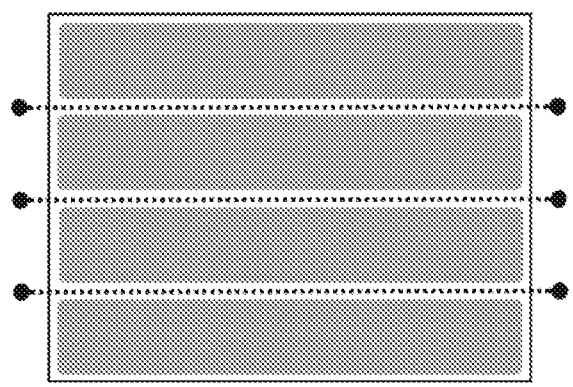
Figure 5A:
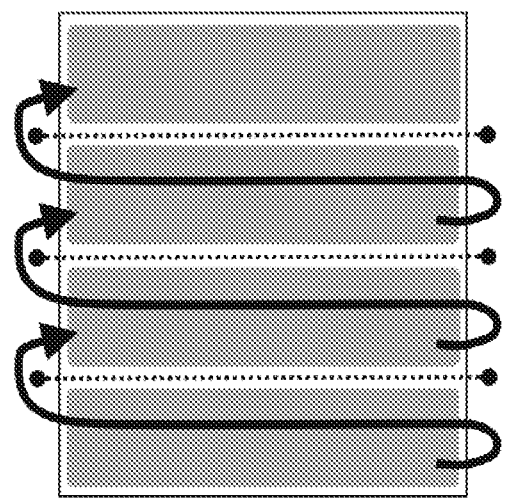

FIGS. 5A, B and C show moving from a four column landscape layout to a three column portrait layout)

Using flow panels a designer can configure a four column layout as shown in FIG. 5A where items of content will fill from the top left flowing down into subsequent containers in the sequence.

When the page dimensions change to portrait however, as shown in FIG. 5B, this creates a much tighter layout. The columns are now very narrow and tall. To give the designer more control the Variations System allows variation rules to be defined. In the case of FIG. 5C the right hand illustration shows a variation applied which states that should the aspect ratio change to be portrait the fourth control region should be collapsed. This now provides a three column layout with appropriately proportioned columns. The designer can readily select this variation because it will be listed as an option related to portrait mode display e.g. a check box that says "maximum number of columns is 3'; the designer selects that option by checking a tick box.

The ability to create variation rules means a designer can tweak precisely the positioning of many objects which are dependent on these control wires in a very simple manner. As well as collapsing or hiding regions, designers may also adjust the size of the region in millimetres or as a percentage.

Introduction to the Umajin Language

The Umajin language is the internal representation of the application. It is a declarative textual language which is read by the Umajin engine and simulated to create the runtime behaviour. How the Umajin language encodes the pages, hierarchy of components, properties and variations is useful to understand. Due to the design of the language this is an orthogonal representation of how the engine stores the scene in memory and is fully defined with no unknown states.

The Umajin language is strongly typed (i.e. it doesn't allow Java style variables but instead includes a very limited number of base types and classes, making declarations non-ambiguous). There are base types like string, vect, float etc—there are object types and there are visual_object types. In the Umajin language new types can be statically declared based on the base classes using the define keyword.

Umajin relies on the Umajin engine to simulate the code. Umajin is designed to be an object oriented application system which supports gestural input, animation and 3D accelerated presentation.

The Umajin engine manages the scene tree and the rendering of visual objects. It also raises events, handles message passing, processes any animations (tweens) and any equivalences (known as reactive programming).

The Umajin language is used as the basis for the project files which create the applications designers create 6) Umajin Supports Variations Internally with States To ensure that variations can be statically declared just like the rest of the system a new language feature has been introduced. This is where objects have multiple named states or conditions where one or more properties or actions can be overridden. At its simplest this is a great way to handle localization but it is extensible to any condition where a different presentation or behavior is required.

In the following, 'instance' is a special keyword, 'button' is a base class and 'add_button' is an object. We are setting the 'x' position of the 'add_button' object at 20 pixels from the left border and the 'y' position at 100 pixels up from the bottom border. The add_button object is 200 pixels wide and 50 pixels high. Clicking on the 'add_button' object triggers an add function (e.g. it might add an item to a shopping basket).

```
instance button add_button
    .x = 20
    .y = 100
    .width = 200
    .height = 50
    .caption = "add"
    method on_mouse_down(int x, int y, int mod)
        do_add( )
    End
```

We can then define different states; the designer can alter the state in the GUI just by selecting from different related states in a GUI, such as a menu or checklist. For example, there could be a check list of ten different languages (English, German, French etc.). If the designer selects the check box for German, then this alters the language state to German which leads to different actions and conditions. For example, it could lead, continuing with the preceding code example, as follows, which has the effect of making the add_button object have a width of 300 pixels and start at 5 pixels from the left hand border, over-riding the previous properties, and to include the caption 'hinzüfugen' instead of 'add'. Also, if the page is displayed in portrait mode, the width remains at 300 pixels, but increases to 400 if in landscape mode.

```
    state language_german
        .width = 300
        .x = 5
        .caption = "hinzufügen"
        method on_mouse_down(int x, int y, int mod)
            check_region( )
            do_add( )
        end
    end
    state orientation_landscape
        .width = 400
    end
end
```

Figure 6B:
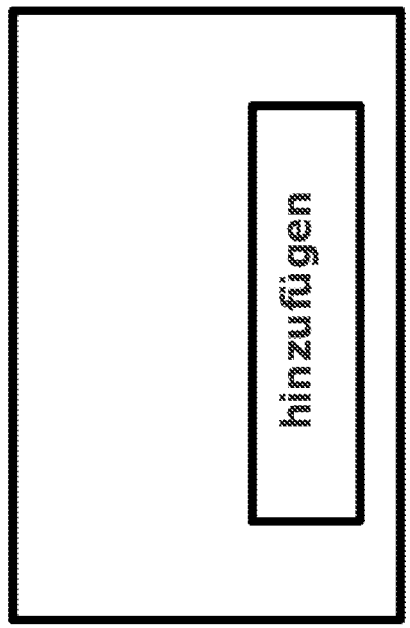
FIGS. 6A and 6B show how the "language_german" overrides the "width" property and the "caption".
Figure 6A:
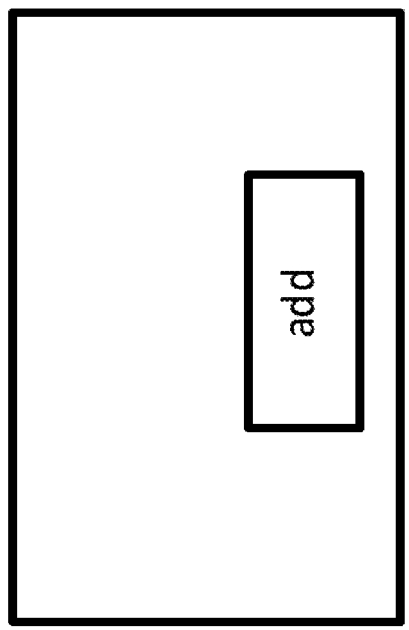

In FIGS. 6A and 6B you can see how the "language_german" overrides the "width" property and the "caption". It also adds a new behaviour for the actions.

The behavior of the engine is that the "add_button" object will start with the initial properties and methods. Setting the state property of "add_button" to "language_german" will apply the new properties and methods but will not reset properties which are not specified in the state.

States can be added to defines and instances and around methods—they however cannot exist inside methods.

The variations engine uses variation rules to apply changes to the layout of a page or a masterpage (which multiple pages can be subclassed from). It allows modifications to control regions and other objects or masterobjects (which multiple objects can be subclassed from) contained on these pages.

A variation for an object can either set a property or override an event, where the event can have a different list of actions. This can be visualised as a checklist by the designer using the Umajin editor.

TABLE 1

| Conditions | Target | Variation |
| --- | --- | --- |
| OS = iOS | Page1:Object:Toolbar | Visible = false |
| Region = NZ | Page2:Object:Buybutton | tax = 15.0 |
| Region = NZ | Page2:Object:Buybutton | Event:on_press |
| Orientation = Portrait | Masterpage1:Region:column4 | Visible = false |
| Orientation = Landscape | Masterpage1:Region:toolbar | Height = 10 mm |

Table 1 shows a list of some example variations applying to adjust various target objects, given various conditions. The designer simply selects a check box corresponding to each item in the Condition column that is relevant. As well as the conditions in the example, the variations can be triggered on a combination of Operating System, Region, Manufacturer, Orientation, Pixel Density, Device or Language. The target is the item to apply the variation to. This can be either a page or a masterpage and can refer to any item contained therein.

Conditions are evaluated upon startup and after changes to any of these attributes. The conditions are evaluated in order and each condition maintains a state of how it has been applied so that it is applied the first time the condition matches and it is correctly reset when the condition stops matching.

The result is that designers can very simply create lists of variations (ie variations or alterations to defined targets, depending on the applicable conditions) to specify detailed design, layout or behavioural changes. This list can easily be reviewed and discussed within teams of non-technical staff.

7) How Variations Apply to the Actions System

FIG. 7 shows how multiple copies of an object can be created by a variation. In FIG. 7, a variation of the Buy-Button object is created for when the region is set to New Zealand. This will allow the actions to perform different behaviours when this variation condition is applied. There is a list of events for a specific component which a user can add actions against. These events will vary. For example a button component has an on_press event and a video component has on_start and on_finished events. The arrow icon in this figure displays a dropdown or list, in this example it will be a list of events for the component the user has selected.

Figure 8:
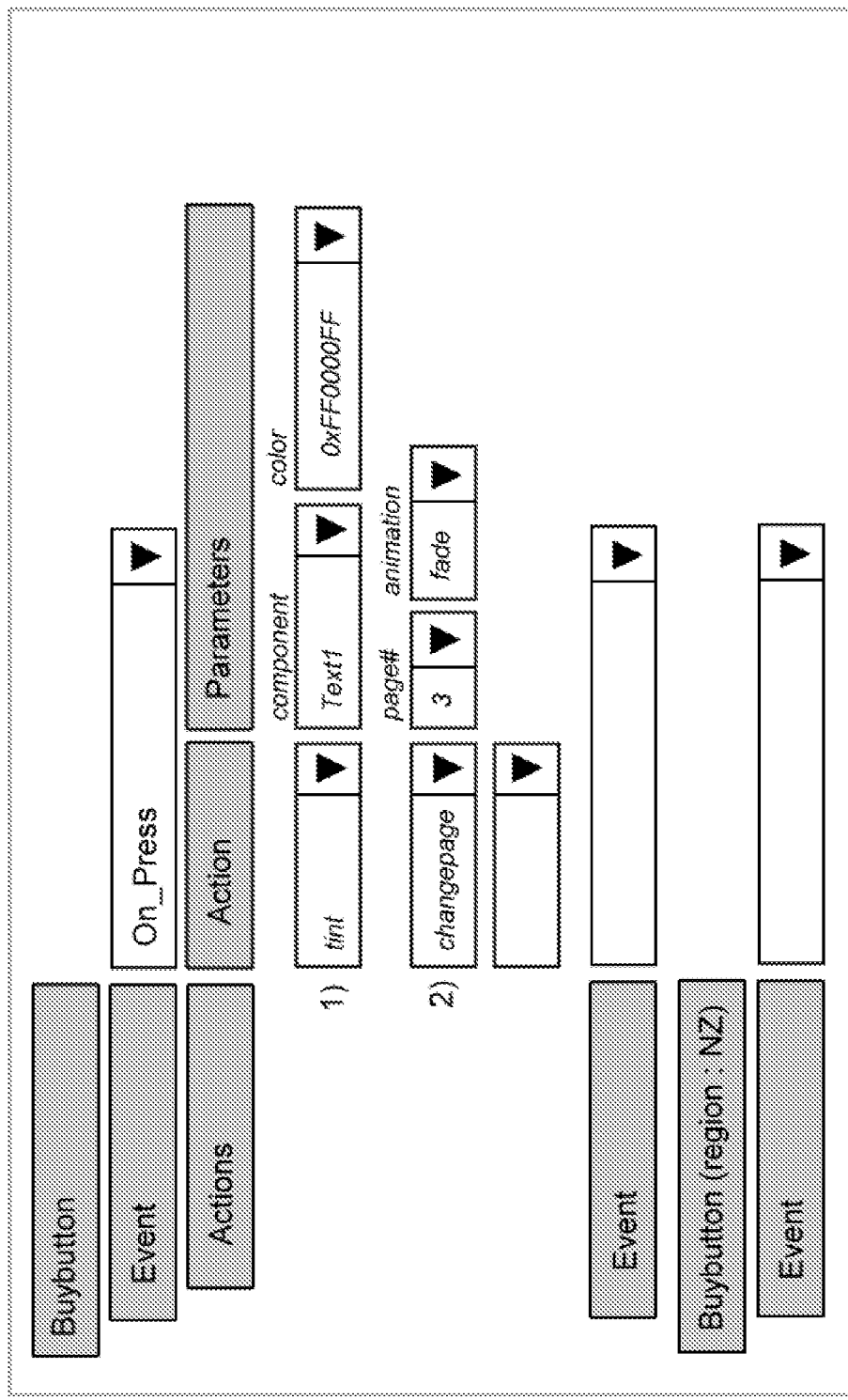
FIG. 8 shows that an On_Press event has been selected and two actions added to the event.

FIG. 8 shows how an On_Press event has been selected and two actions added to the event. There is a library of pre-defined actions which users can choose from. Multiple actions can be stacked up into a list. In this example there are two actions in a list. The first lets the user tint a specific component (text1) a specific color (red in hexadecimal) and to changepage to a specific page (page 3) and with an animation (a fade).

Programmers can extend the list of actions users can choose from using a normal procedural language, Javascript or Lua are supported.

While designers cannot create loops or arbitrary conditional structures the fact that variations can spawn multiple lists of actions makes this deceptively powerful. An example of this would be an action which varies based on region like a shipping calculation in USA vs UK vs New Zealand. The ability to create an action list for a master object also helps with reuse as all objects based on this master object will inherit this behaviour unless specifically overridden.

You can see that the separation of the conditional logic (variations) has resulted in a list for each page which is extremely easy for designers and other non-programmers to use. This does not requires any mastery of syntax or object models and can be added to and edited with mouse or touch. These representations support user exploration and discovery, team discussion and have simple step by step execution models.

8) Example Panel Layout with Variations

Figure 9:
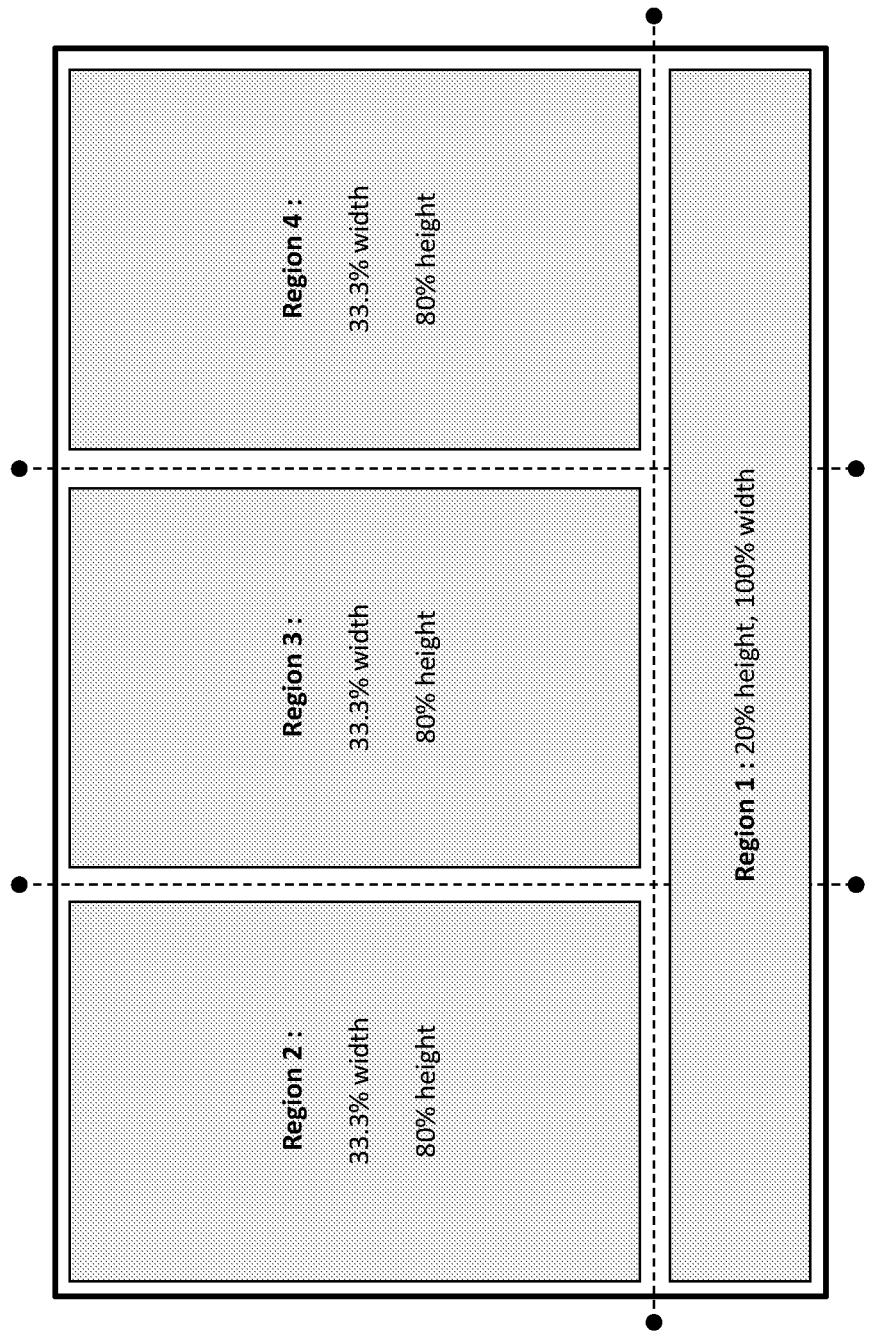
FIG. 9 shows a landscape layout with four regions (Regions 1 . . . 4).
Figure 10:
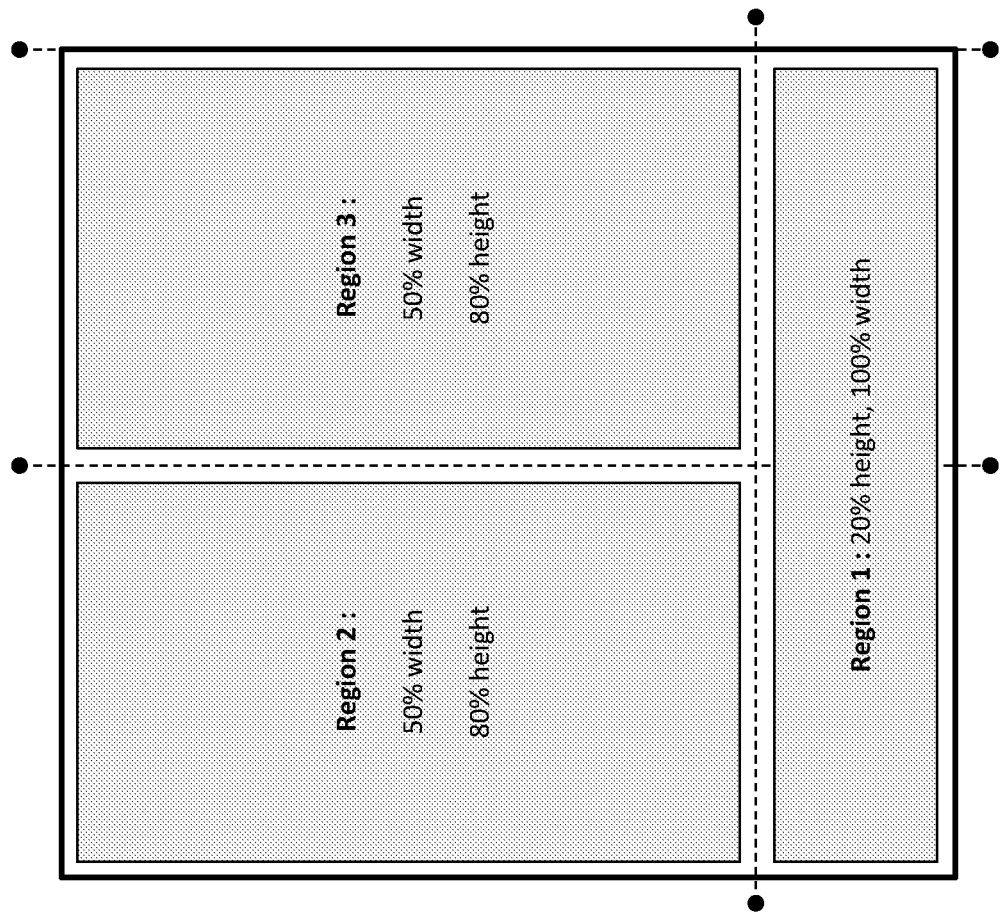
FIG. 10 shows a portrait variation of the FIG. 9 layout with Region 4 collapsed.

A landscape layout with four regions is shown in FIG. 9. A portrait variation of this layout with Region 4 collapsed is shown in FIG. 10, and summarised in Table 2:

TABLE 2

| Conditions | Target | Variation |
| --- | --- | --- |
| Orientation = Portrait | Masterpage1:Region 4 | Hide |
| Orientation = Landscape | Masterpage1:Region 4 | Show |

9) Example Application with Back Button in iOS but no Button in Android

Figure 11B:
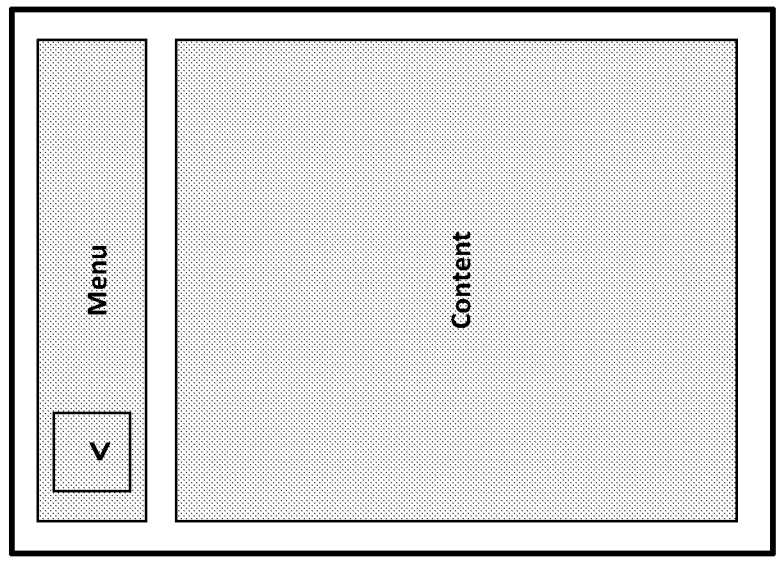
FIG. 11A shows an Android variation of a page with no back button and FIG. 11B shows the iOS variation that does include a back button.
Figure 11A:
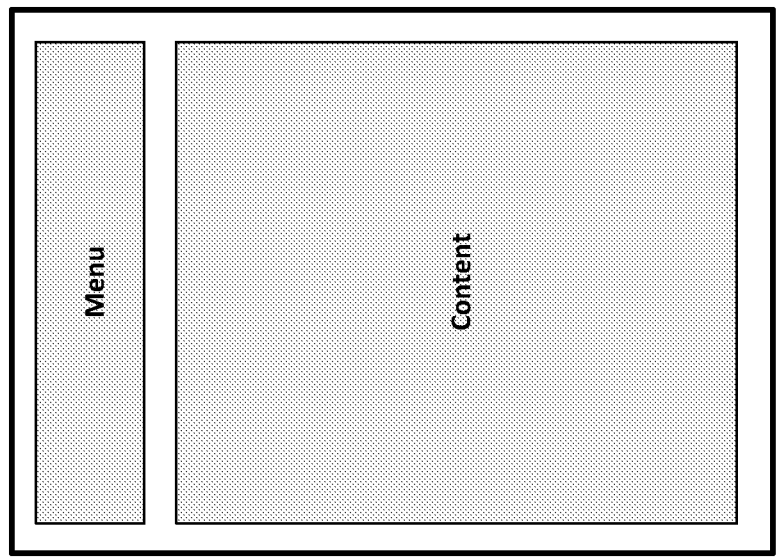

Because Android comes with a back function designers don't need this in their designs. This is a good example of a common variation between operating systems. The Android variation is shown in FIG. 11A and the iOS variation shown in FIG. 11B. Table 3 below shows this, with the condition (here called a 'rule') being either OS is Android or OS is iOS; the associated variations are applied to actions, namely to hide the back button (in the case of Android) or to show it, in the case of iOS.

TABLE 3

| Conditions | Target | Variation |
| --- | --- | --- |
| OS = Android | Masterpage1:back button 1 | Hide |
| OS = iOS | Masterpage1:back button 1 | Show |

Figure 12:
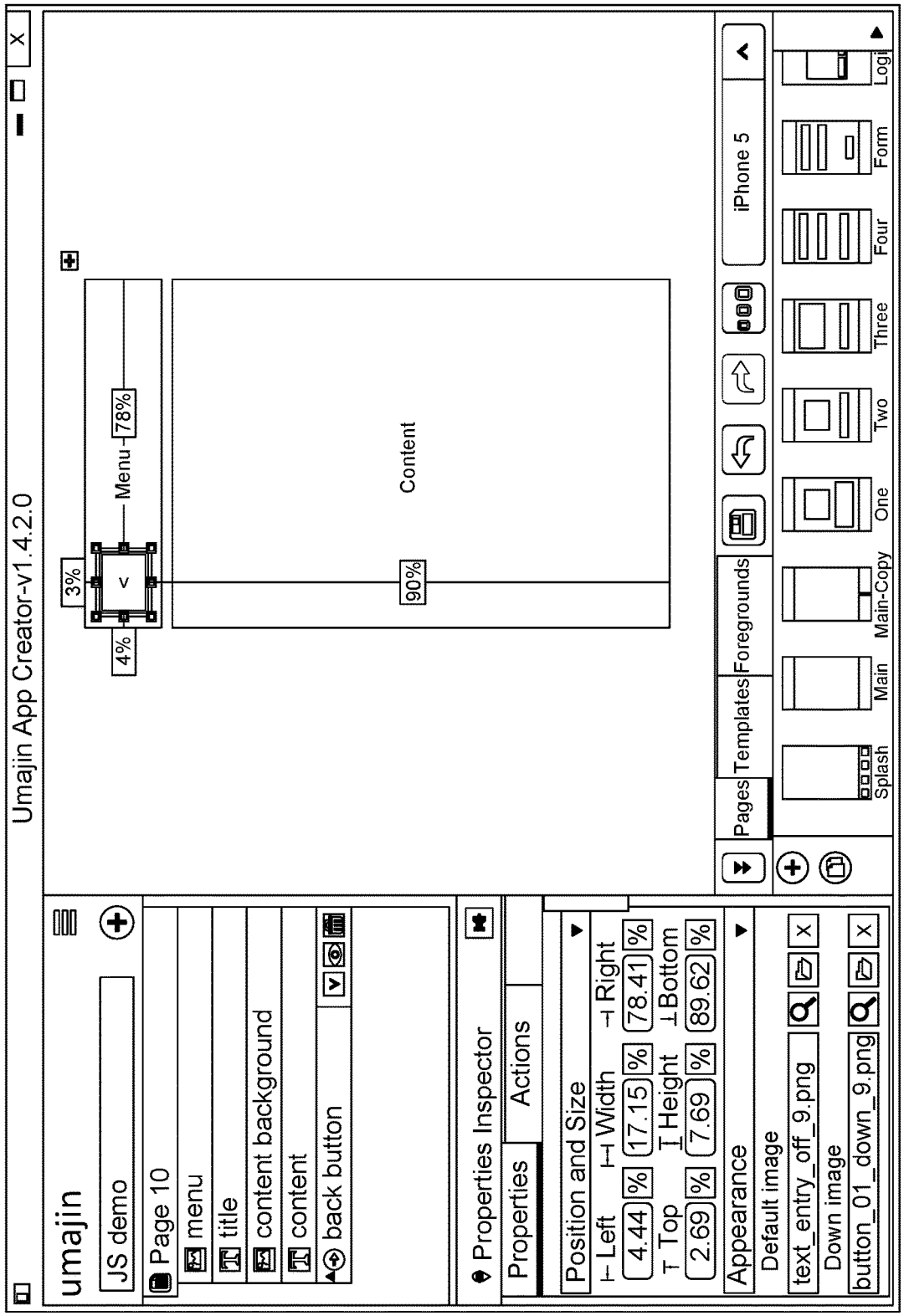
FIG. 12 is a screenshot of the rapid application development editor, showing a back button in the top left that is visible because the app is for an iOS device and showing the condition (device is iPhone 5) and the related variation (that a back button is visible on the page and, under the Properties tab, what its position, size and appearance are like).

In the FIG. 12 screenshot, the back button in the top left is only visible on an iOS device. You can see the iPhone 5 is the selected device for the editor (right side menu item, below the image of the page). The back button is shown in the list of items on the page with a 'v' icon indicating it has a variation applied. The user can now press the 'V' icon to bring up the variations checklist which will show them there is a visibility variation based on which OS has been applied.

When the user changes the editor to use a new device, changing the iPhone 5 to instead visualise an Android device, the button will correctly hide on the page preview, but still be visible in the list of items on the left.

Here is the internal language representation of this variation;

```
Instance button back_button
    .caption = "<"
    method on_mouse_down(int x, int y, int mod)
        back( )
    end
    state os_android
        .visible = 0
    end
end
```

The invention claimed is:

1. A processor implemented method for rapid software application development comprising the steps of:
   (a) using a declarative textual language as an internal representation of a software application, wherein the declarative textual language encodes pages, a hierarchy of components, properties and variations, the representation including a scene tree, in which the representation is fully defined with no unknown states, wherein the declarative textual language is strongly typed, the declarative textual language including base types and base classes, object types and visual object types, the declarative textual language allowing new types to be statically declared based on the base classes, wherein the declarative textual language is not a Turing complete language;
   (b) displaying in a graphical user interface (GUI) of a software application development editor a list of variations based on or applying to conditions in the software application, each variation being associated with one or more changes in properties or events in the software application, and each variation being a statically declared non-ambiguous state;
   (c) enabling a user to select a specific variation, and receiving a user selection of the specific variation, and including the selected specific variation into the declarative textual language internal representation of the software application;
   (d) an engine reading the declarative textual language internal representation of the software application, including reading the scene tree representation, to simulate runtime behavior of the software application to display, in the graphical user interface, the user interface implications or consequences of the selection;

and in which the operations of the method are executed by a processor.

2. The method of claim 1 in which the GUI displays all of the possible variable states of the application in one place, on a page by page basis for each page or screen of the application.

3. The method of claim 1 in which the GUI includes items selectable from a menu.

4. The method of claim 1 in which the GUI includes a visual checklist.

5. The method of claim 1 in which the variations are executed top to bottom in the list.

6. The method of claim 1 in which visual flags are provided for a user to visually see if a variation has been applied in the editor and to see if the user has tested their application for all possible variations.

7. The method of claim 1 in which selecting a specific variation automatically results in consequential changes to hierarchically related parameters or variables.

8. The method of claim 1 in which the variation applies to the following condition in the application: Region.

9. The method of claim 1 in which the variation applies to the following condition in the application: Language.

10. The method of claim 1 in which the variation applies to the following condition in the application: OS (operating system).

11. The method of claim 1 in which the variation applies to the following condition in the application: Orientation, wherein the Orientation condition includes a selection of landscape or portrait.

12. The method of claim 1 in which the variation applies to the following condition in the application: Device type, wherein the Device type condition includes a selection of watch, phone, tablet, computer, or TV.

13. The method of claim 1 in which the variation applies to the following condition in the application: a selection of pixel density.

14. The method of claim 1 in which the variation applies to the following condition in the application: a selection of Manufacturer & device model.

15. The method of claim 1 in which the variation applies to the following condition in the application: Custom, wherein the Custom condition includes a selection of user defined flags.

16. The method of claim 1 in which the application is represented in a language in which objects have multiple named states, where one or more properties or actions can be over-ridden.

17. The method of claim 1 in which variations apply to a target, or to a target object, or to a target master-object, or to a target region.

18. The method of claim 1 in which variations apply changes to the layout of a page or a masterpage, wherein the masterpage is one from which multiple pages can be sub-classed.

19. The method of claim 1 in which variations allow modifications to control regions and other objects or masterobjects, wherein a masterobject is one from which multiple objects can be subclassed, contained on each page.

20. The method of claim 1 in which variations on an object can either set a property or override an event, where the event can have a different list of actions.

21. The method of claim 1 in which the conditions are evaluated upon startup and after changes to any of the conditions' attributes.

22. The method of claim 1 in which the conditions are evaluated in order and each condition maintains a state of how it has been applied so that it is applied the first time the condition matches and it is correctly reset when the condition stops matching.

23. The method of claim 1 in which the editor enables a user to create lists of variations or alterations to defined targets, depending on the applicable conditions in order to specify detailed design, layout or behavioural changes.

24. The method of claim 1 in which a variation creates a custom action, allowing actions to be overridden for a specific variation.

25. The method of claim 1 in which the engine manages rendering of visual objects.

26. The method of claim 1 in which the engine also raises events, handles message passing, processes any animations and processes any equivalences.

27. A software application developed using a processor implementing a method for rapid software application development, the software application embodied on a non-transitory storage medium, the processor configured to:
(a) use a declarative textual language as an internal representation of a software application, wherein the declarative textual language encodes pages, a hierarchy of components, properties and variations, the representation including a scene tree, in which the representation is fully defined with no unknown states, wherein the declarative textual language is strongly typed, the declarative textual language including base types and base classes, object types and visual object types, the declarative textual language allowing new types to be statically declared based on the base classes, wherein the declarative textual language is not a Turing complete language;
(b) display in a graphical user interface (GUI) of a software application development editor a list of variations based on or applying to conditions in the software application, each variation being associated with one or more changes in properties or events in the software application, and each variation being a statically declared non-ambiguous state;
(c) enable a user to select a specific variation, and to receive a user selection of the specific variation, and to include the selected specific variation into the declarative textual language internal representation of the software application; and
(d) execute an engine reading the declarative textual language internal representation of the software application, including reading the scene tree representation, to simulate runtime behavior of the application to display, in the graphical user interface, the user interface implications or consequences of that selection.

28. A system for rapid software application development comprising a processor and a software application development editor embodied on a non-transitory storage medium and executable on the processor, wherein the processor is programmed to use a declarative textual language as an internal representation of a software application, wherein the declarative textual language encodes pages, a hierarchy of components, properties and variations, the representation including a scene tree, in which the representation is fully defined with no unknown states, wherein the declarative textual language is strongly typed, the declarative textual language including base types and base classes, object types and visual object types, the declarative textual language allowing new types to be statically declared based on the base classes, wherein the declarative textual language is not a Turing complete language; to display in a graphical user interface (GUI) a list of variations that are based on or applying to conditions in the software application, each variation being associated with one or more changes in properties or events in the software application, and each variation being a statically declared non-ambiguous state;

wherein the processor is further programmed to enable a user to select a specific variation, to receive a user selection of the specific variation, and to include the selected specific variation into the declarative textual language internal representation of the software application; and to execute an engine reading the declarative textual language internal representation of the software application, including reading the scene tree representation, to simulate runtime behavior of the software application to display, in the graphical user interface, the user interface implications or consequences of that selection.

* * * * *